March 13, 1951  G. F. BREDL ET AL  2,544,774
NONSKID AND AUXILIARY TRACTION DEVICE
Filed Sept. 12, 1947  2 Sheets-Sheet 1

INVENTORS
George F. Bredl
Michael M. Bredl
Wenzl F. Bredl
BY Parker, Trochnow & Farmer,
Attorneys.

March 13, 1951 G. F. BREDL ET AL 2,544,774
NONSKID AND AUXILIARY TRACTION DEVICE
Filed Sept. 12, 1947 2 Sheets—Sheet 2

INVENTORS,
George F. Bredl
Micheal M. Bredl
BY Wenzl F. Bredl
Parker, Prochnow & Farmer,
Attorneys.

Patented Mar. 13, 1951

2,544,774

UNITED STATES PATENT OFFICE 2,544,774

NONSKID AND AUXILIARY TRACTION DEVICE

George F. Bredl and Michael M. Bredl, Buffalo, and Wenzl F. Bredl, Sloan, N. Y.

Application September 12, 1947, Serial No. 773,644

14 Claims. (Cl. 180—15)

This invention relates to improvements in devices for preventing skidding of motor vehicles and for providing auxiliary traction for such vehicles, particularly on slippery pavement.

One of the objects of this invention is to provide a device of this kind including a ground gripping wheel having teeth or projections adapted to grip the ground or surface on which the vehicle is traveling and which wheel is driven directly from an adjacent driven wheel of the vehicle. Another object of this invention is to provide a mechanism of improved construction for easily and quickly moving the ground gripping wheel into and out of engagement with the ground or surface on which the vehicle is traveling. Another object is to provide mechanism of improved construction for supporting the ground gripping wheel in an inoperative position out of engagement with the surface on which the vehicle is traveling when the ground gripping wheel is not needed.

Another object is to provide an improved drive mechanism for the ground gripping wheel whereby this wheel may be driven by a belt which is automatically tightened when the wheel is lowered into operative relation to the surface on which the vehicle is traveling. A further object is to provide an auxiliary traction device of this type of improved construction which may be readily applied to a vehicle and removed therefrom. Other objects and advantages of this invention will appear from the following description and claims.

Figure 1:
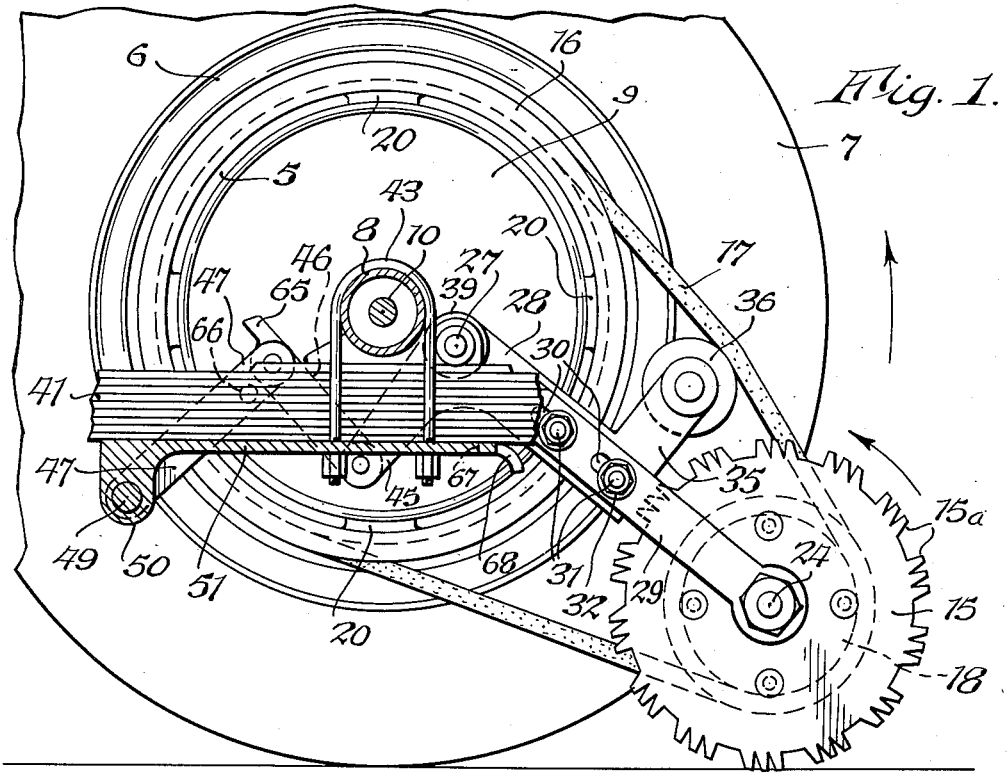
Fig. 1 is a fragmentary elevation, partly in section, showing an anti-skid and auxiliary traction device embodying this invention, the section being taken on line 1—1, Fig. 3.

Our improved anti-skid and auxiliary traction device is illustrated in the accompanying drawings as applied to a driven or rear wheel of the motor vehicle of a certain type, but it will be understood that our improved device may be applied to vehicles of other constructions. 5 represents the wheel having a rim 6 secured thereto on which a tire 7 is mounted, the wheel being secured to an axle 10 contained within an axle housing 8, and a brake drum 9 is also mounted on the axle 10. The wheel is removably connected with the axle by any usual means including studs 11 formed to extend through holes in the wheel, and the wheel is secured to the studs by means of the usual nuts 12. 13 represents a hub cap which covers and conceals the nuts 12.

15 represents a ground gripping wheel which may be of any suitable construction and which, in the construction illustrated, is in the form of a disk constructed to engage the road or other surface on which the vehicle is propelled. This disk is preferably made of steel and is provided with teeth 15a which preferably have substantially flat outer surfaces which form cutting edges with the adjacent sides of the teeth. The teeth are preferably arranged in groups with clear spaces between the groups. In the construction illustrated by way of example, the teeth are arranged in groups of three and the groups are separated by clear spaces of less length circumferentially of the disk than the groups of teeth. This construction and arrangement of the teeth has been found very effective for providing traction on ice formed on a pavement or surface. A ground gripping wheel of other suitable form may be employed in place of the disk shown.

This disk 15 is positively driven from the wheel 5 in any suitable manner, and in the construction illustrated by way of example, we have provided a pulley 16 which may be removably secured to the wheel 5 and which drives a belt 17 which operates on a pulley 18 suitably riveted or otherwise secured to the disk 15. The pulley 16 may be mounted on the wheel in any suitable or desired manner and in the construction illustrated, we have provided a spider including a plurality of arms 20 extending substantially radially and laterally from the disk portion 21 which is provided with suitable holes arranged in such a manner that the studs 11 by which the wheel is supported on the axle may be passed through the holes. After the disk portion 21 has been positioned with the studs 11 projecting through the holes thereof, the wheel 5 is then placed into its operative position and secured by means of the nuts 12 so that the disk 21 is clamped between the wheel 5 and the part of the brake drum 9 in which the wheel is secured. This provides a convenient manner of mounting the pulley 16 so that it is positively driven from the axle 10. Sprocket wheels and chain connecting them may obviously be substituted for the pulleys and belt.

The ground gripping wheel or disk 15 and the driven pulley 18 secured thereto are rotatably mounted in any suitable manner on a stud or bearing pin 24, for example, by means of a suitable ball bearing 25, and the bearing pin or stud 24 is rigidly secured on an arm which is pivotally mounted to swing about a bearing or pivot member 27. In order to make our improved mechanism readily adaptable for use in connection with wheels or tires of different diameter, this arm is preferably adjustable as to length and for this purpose, in the particular construction shown by way of example, the arm is made in two parts, one part 28 being mounted to swing about the pivot 27, and the other part 29 having the stud 24 secured thereto. The part 29 is provided with slots 30 and bolts or threaded pins 31 are secured to the part 28 of the arm and extend through the slots 30 and may be secured in the desired position within the slots by means of clamping nuts 32 on the threaded bolts 31. In order to securely lock the two parts of the arm against movement, the part 28 may be provided with a threaded boss 33 welded or otherwise secured thereto through which an adjusting screw 34 passes with its end engaging the end of the part 29 of the arm. By means of this mechanism the length of the arm can be readily adjusted as may be desired.

Figure 2:
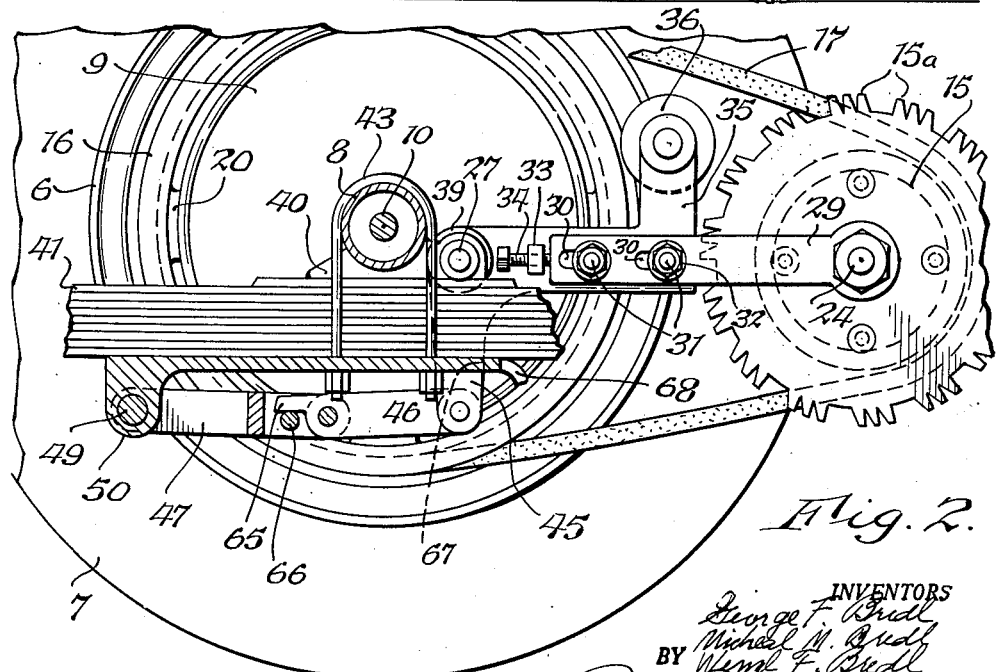
Fig. 2 is an elevation similar to Fig. 1 showing the parts of the mechanism in the positions they occupy when the disk is out of operative relation to the surface over which the vehicle is traveling.

The part 28 of the arm is also provided with an upwardly extending projection or part 35 on the end of which an idler pulley or wheel 36 is rotatably mounted. As will readily be seen by inspection of Figs. 1 and 2, when the arm is swung downwardly into its operative position as shown in Fig. 1, the idler wheel or pulley 36 will engage the belt 17 so as to apply tension thereto. When the arm is swung into its substantially horizontal and inoperative position as shown in Fig. 2, the idler pulley or wheel 36 will be out of engagement with the belt 17, so that the belt will be slack.

Figure 3:
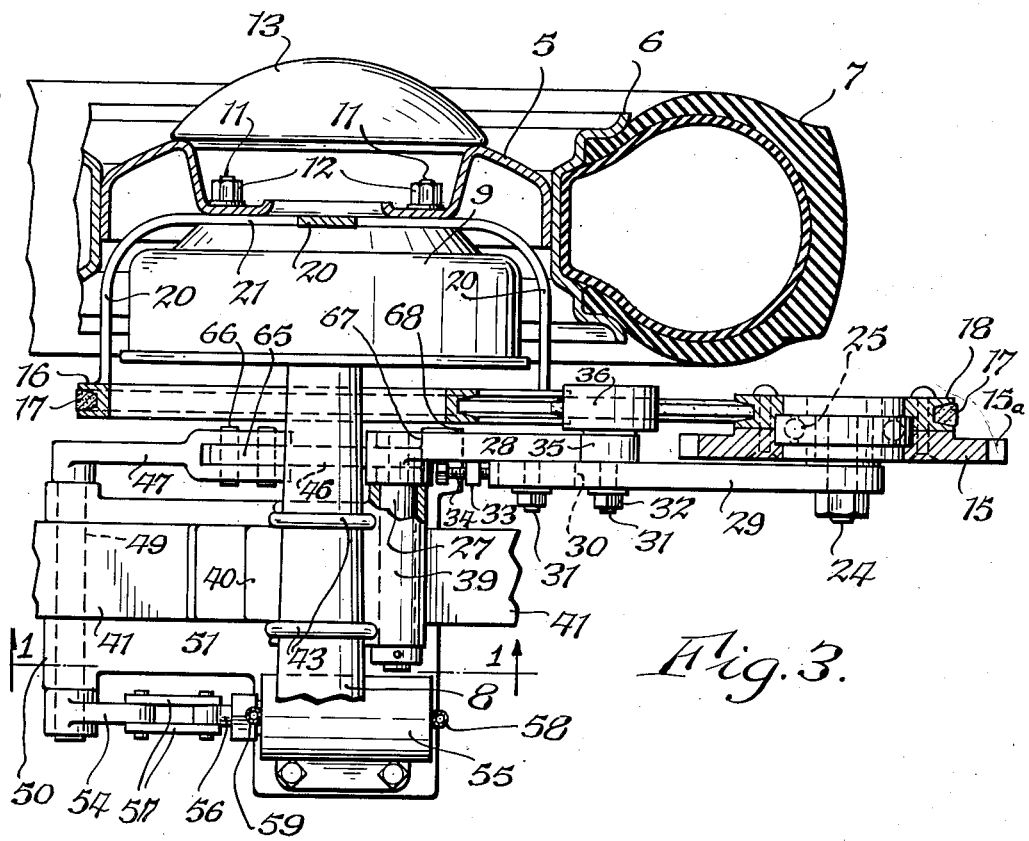
Fig. 3 is a plan view thereof, partly in section.

The pivot or bearing member 27 about which the arm comprising the two parts 28 and 29 swings, may be of any suitable or desired form, and in the construction illustrated by way of example, see particularly Fig. 3, the bearing member 27 is in the form of a rod or shaft journalled in a cylindrical bearing 39 which may be formed integral with a pillow block 40 which may be inserted between the upper portion of the vehicle spring 41 and the axle housing 8, and which is held in place by means of U bolts 43 or the like which clamp the spring and pillow block to the axle housing. The pillow block 40 may, consequently, easily be assembled in fixed relation relatively to the axle housing and the spring 41.

The part 28 of the arm also forms one arm of a bell crank lever formed to swing about the axis of the shaft or pivot 27 and having an integral arm 45 extend in substantially right angular relation to the part 28 of the arm on which the disk is rotatably mounted. This arm 45 extends downwardly from the pivot member 27 and the lower end thereof may be pivotally connected in any suitable manner with one end of a link 46, the other end of which is pivotally connected with a crank arm 47. Preferably the ends of the arms 45 and 47 are bifurcated, so that the link 46 extends between the prongs or projections of the bifurcated ends of the arms 45 and 47.

The crank arm 47 is rigidly secured to one end of a crank shaft or pivot member 49 which is rotatably mounted in a lug or bearing member 50 which may be formed on one end of a plate 51 which may be rigidly secured with reference to the axle housing and which in the particular construction illustrated is clamped to the lower face of the spring 41 by means of the U bolts 43. This plate 51 is preferably of considerably greater width than the spring leaves and may be readily applied to the spring leaves by merely releasing the nuts of the U bolts 43 and positioning the plate 51 which has suitably formed holes therein in such a manner that the ends of the U bolts extend through the holes, whereupon the nuts of the U bolts may again be put in place.

Figure 4:
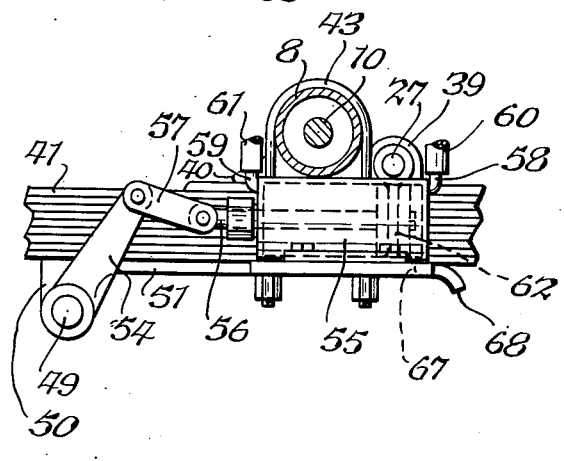
Fig. 4 is a fragmentary end elevation thereof.

The pivot member or crank shaft 49 has secured to the other end thereof an arm or crank 54 which extends upwardly at the side of the spring 41 opposite to that on which the crank arm 47 is located. It will be obvious that by swinging the crank arm 54 in such a manner as to turn the shaft or pivot member 49, the other arm 47 through the medium of the connecting link 46 will cause the arm on which the toothed disk is mounted to swing into either of the two positions shown in Figs. 1 and 2. Swinging motion may be applied to the arm 54 in any suitable or desired manner. However, preferably the power for swinging the arm 54 is obtained from a piston 62, Fig. 4, mounted to reciprocate in a cylinder 55 which may conveniently be mounted on a lateral extension of the plate 51. The piston 62 is secured to a piston rod 56, one end of which is connected with the outer end of the crank arm 54 in any suitable manner, for example by means of a pair of links 57. Any other suitable or desired connection between the cylinder 55 and the crank arm 54 may be provided.

The piston 62 within the cylinder 55 may be actuated by any suitable fluid. We prefer to employ the suction produced in the engine cylinders during the operation of the engine which propels the vehicle, and for this purpose, a pair of pipes or elbows 58 and 59 are provided which are connected to opposite ends of the cylinder 55 and to which flexible tubes 60 and 61, see Fig. 4, may be connected. Any suitable valve arrangement (not shown) may be employed for connecting either tube 60 or 61 with the engine manifold and when one of these tubes is connected with the engine manifold, the other is connected to the outside air, so that the piston 62 may be moved either to the left or right of that figure. When the piston is moved to the right, and consequently, occupies the position shown in Fig. 4, the crank arms 54 and 47 will also be swung to the right or in a clockwise direction into the position illustrated in Fig. 2, thus moving the disk into the elevated position shown in Fig. 2. When the piston 62 is moved to the left in the cylinder 55 in Fig. 4, the crank arms 54 and 47 will also be swung to the left or in a counterclockwise direction, so that the parts will occupy the positions shown in Figs. 1 and 3 in which the disk 15 will be pressed against the surface upon which the vehicle is supported. The valve (not shown) for controlling the connection of the tubes 60 and 61 with the suction and the atmosphere is preferably located in a position convenient to the driver of the vehicle, so that the disk 15 may conveniently and quickly be placed into operative or inoperative positions as may be required.

It is very desirable to provide means for supporting the disk 15 in elevated position when the engine is not in operation, and consequently, when no suction is applied to the cylinder 55, and for this purpose, we have so arranged the crank arm 47 with reference to the link 46 so that when the disk 15 is in its upper or inoperative position, the crank arm 47 and link 46 will be slightly beyond dead center relation to each other. In order to make sure that the link and crank arm will remain in this position, we provide suitable stop means for preventing movement of these links materially below their dead center positions. Any suitable stop means may be provided for this purpose, and in the construction shown by way of example, we provide the link 46 at one end thereof with a finger or extension 65 and we provide a pin 66 which extends across the opening formed by the bifurcated end of the crank arm 47, the finger 65 and the pin 66 being arranged in such relation to each other as to engage when the crank arm and link have moved slightly below their dead center positions. Consequently, when the suction is interrupted, the disk 15 will remain in its upper or inoperative position, as shown in Fig. 2. If, however, the piston 62 within the cylinder 55 is moved to the left in Fig. 4, this dead center relation will be broken and the disk 15 will be urged against the surface on which the vehicle is supported with a resilient pressure. By making the cylinder 55 of the necessary size, this pressure will be sufficient to enable the teeth 15a of the disk 15 to grip any ice formed on the pavement, whereupon the rotation of the disk by means of the belt 17 will cause the vehicle to be propelled by means of the disk 15, even though the tire 7 of the wheel may slip on the pavement. Also when there is a tendency of the wheel to skid or slide sideways, the disk 15 is lowered to prevent such skidding or sidewise movement. The disk thus serves the two-fold purpose of preventing skidding of the tire and of providing additional traction if the tire is on an icy surface on which no traction can be obtained through the medium of the tire itself.

By arranging the crank arm 47 and the link 46 in substantially dead center relation to each other, the shocks to which the disk is subjected due to up and down motion of the spring 41 on which our mechanism is mounted through traveling over rough roads are not transmitted to the piston rod 56 or the cylinder 55 so that long life of this mechanism is assured. Another stop 67 is preferably provided, which may be formed by an edge of an extension of the plate 51 toward the brake drum 9. This stop is so located that when the crank arm 47 and the link 46 are in dead center positions, the downwardly extending arm 45 of the bell crank lever on which the disk 15 is mounted will engage this stop. Consequently when any irregularities in the road are encountered which would cause the disk 15 to move upwardly relatively to the vehicle wheel, the stop 67 will limit such swinging of the bell crank lever and will prevent the strains resulting from the tendency to swing upward from being transmitted to the link 46 and the arm 47 connected therewith. Consequently when the disk 15 is in its upper position, the bell crank lever on which it is mounted will be held by the stop 67 and by the dead center relationship of the link 46 and arm 47 from swinging in either direction about its pivot. Since the arm 54 as well as the arm 47 are both located at the right side of the crank shaft or pivot member 49 as shown in the drawings, any shocks or vibrations to which the wheels 7 are subjected will tend to urge the arm 47 into the position shown in Fig. 2. Other means for stopping the swinging of the bell crank lever into its inoperative position may be provided. When the disk is in its upper position as shown in Fig. 2, the slack belt 17 may cause rotation of the disk 15, but since this disk is preferably also journaled by means of ball bearings, no material loss of power or inconvenience results from the idling of this disk during the normal operation of the vehicle. With the construction described, when the engine is stopped and the parts of the mechanism are in their inoperative positions, they will remain in such positions.

The disk is preferably mounted in rear of a rear wheel, which during forward motion is driven in the direction of the arrow shown in Fig. 1 and the disk will, consequently, be driven in a direction as shown by the arrow adjacent thereto in Fig. 1, to rotate in the same direction as the vehicle wheel. Since this rotation may tend to cause the disk to advance forwardly in such a manner as to lift the rear wheel to which it is attached, stop members are preferably provided to limit the extent to which the disk may move forwardly with relation to the wheel. In the construction shown for this purpose, I have provided on the extension 67 which forms a stop for the arm 45, a downwardly curved flange 68 which is arranged to engage the part 28 of the arm on which the disk is mounted if this arm swings to a greater extent than desired forwardly with reference to the wheel with which it cooperates. Any other suitable or desired means for limiting the swinging of the arm which carries the disk may be provided, if desired.

When the mechanism is not to be used, for example, during summer driving, it is a comparatively simple matter to remove the pulley 16 from the wheel on which it is mounted by merely releasing the wheel supporting nuts 12 and removing the wheel and then the spider 20 on which the pulley 16 is mounted. If desired, the part 29 of the disk supporting arm may also be removed by loosening the clamping nuts 31. The remaining portions of the mechanism may be left on the vehicle without interfering in any way with the operation thereof, or they may also be removed, if desired. Consequently, when the season of the year approaches during which skidding is apt to be encountered, the mechanism can be easily put into use again by replacing the spider 20 and the pulley 16 together with the belt and the part 29 of the arm. The entire mechanism may, however, be left on the vehicle during summer driving. The construction described has the further advantage that mechanism is readily available for use at any time when icy or slippery roads are encountered by merely admitting air to the tube 60 and connecting the tube 61 with a source of suction and as has been stated this can be readily done by means of a simple type of valve which can be put on the vehicle in a position which can be readily accessible by the driver.

While we have illustrated our invention by means of mechanism mounted for use in connection with one wheel only of the vehicle, it will be obvious that better results are obtained if a similar mechanism is employed for each driven wheel of the vehicle. The mechanism is mounted at the inner face of the wheel so that it is practically invisible when in its inoperative position. The mechanism has the further advantage that it may be employed with vehicle wheels of a variety of different sizes, and since the disk is driven from the axle, the disk may be driven in a direction to move the vehicle either forwardly or rearwardly, as may be desired.

It will be understood that various changes in the details, materials and arrangements of parts, which have been herein described and illustrated in order to explain the nature of the invention, may be made by those skilled in the art within the principle and scope of the invention, as expressed in the appended claims.

We claim:

1. A non-skid and auxiliary traction device for a motor vehicle having a driven wheel and leaf spring interposed between the vehicle and said driven wheel, said device including a bell crank lever having a ground gripping wheel rotatably mounted on one arm thereof, said bell crank lever being pivotally mounted to swing relatively to said vehicle spring, a link connected at one end thereof with the other arm of said bell crank lever, a crank member having two arms, one of said arms being pivotally connected with the other end of said link, power means connected with another arm of said crank member for oscillating said crank member to move said bell crank lever through the medium of said link for positioning said ground gripping wheel into operative and elevated positions, and a plate secured to said vehicle spring and having a bearing for said crank and an extension for supporting said power actuated means.

2. A non-skid and auxiliary traction device for a motor vehicle having a driven wheel and leaf spring interposed between the vehicle and said driven wheel, said device including a bell crank lever having a ground gripping wheel rotatably mounted on one arm thereof, said bell crank lever being pivotally mounted to swing relatively to said vehicle spring, a link connected at one end thereof with the other arm of said bell crank lever, a crank member having two arms, one of said arms being pivotally connected with the other end of said link, power means connected with another arm of said crank member for oscillating said crank member to move said bell crank lever through the medium of said link for positioning said ground gripping wheel into operative and elevated positions, said first mentioned arm of said crank and said link being provided with stop means for limiting the movement of said arm and link relatively to each other during the raising of said ground gripping wheel at a position slightly past the dead center relationship between said first mentioned arm of said crank and said link, to support said ground gripping wheel in elevated position independently of said power actuated means.

3. A non-skid and auxiliary traction device for a motor vehicle having a driven wheel and leaf spring interposed between the vehicle and said driven wheel, said device including a bell crank lever having a ground gripping wheel rotatably mounted on one arm thereof, said bell crank lever being pivotally mounted to swing relatively to said vehicle spring, and being arranged between said spring and said driven wheel, a link connected at one end thereof with the other arm of said bell crank lever, a crank member having two arms, a supporting plate secured to said vehicle spring and having a bearing for said crank, the arms of said crank being located at opposite sides of said spring, and one of said arms being pivotally connected with the other end of said link, a cylinder mounted on said plate and having a piston operatively connected to the other arm of said crank for oscillating said crank to move said bell crank lever through the medium of said link to place said ground gripping wheel into operative and elevated positions, and means for supplying motive fluid to said cylinder to move said piston toward opposite ends of said cylinder.

4. A non-skid and auxiliary traction device for a motor vehicle having a driven wheel and leaf spring interposed between the vehicle and said driven wheel, said device including a bell crank lever having a ground gripping wheel rotatably mounted on one arm thereof, said bell crank lever being pivotally mounted to swing relatively to said vehicle spring, and being arranged between said spring and said driven wheel, a link connected at one end thereof with the other arm of said bell crank lever, a crank member having two arms, a supporting plate secured to said vehicle spring and having a bearing for said crank, the arms of said crank being located at opposite sides of said spring, and one of said arms being pivotally connected with the other end of said link, a cylinder mounted on said plate and having a piston operatively connected to the other arm of said crank for oscillating said crank to move said bell crank lever through the medium of said link to place said ground gripping wheel into operative and elevated positions, means for supplying motive fluid to said cylinder to move said piston toward opposite ends of said cylinder, and stop means for limiting the movement of said ground gripping wheel into its operative position.

5. A non-skid and auxiliary traction device for a motor vehicle having a driven wheel and leaf spring interposed between the vehicle and said driven wheel, said device including a bell crank lever having a ground gripping wheel rotatably mounted on one arm thereof, said bell crank lever being pivotally mounted to swing relatively to said vehicle spring, and being arranged between said spring and said driven wheel, a link connected at one end thereof with the other arm of said bell crank lever, a crank member having two arms, a supporting plate secured to said vehicle spring and having a bearing for said crank, the arms of said crank being located at opposite sides of said spring, and one of said arms being pivotally connected with the other end of said link, a cylinder mounted on said plate and having a piston operatively connected to the other arm of said crank for oscillating said crank to move said bell crank lever through the medium of said link to place said ground gripping wheel into operative and elevated positions, means for supplying motive fluid to said cylinder to move said piston toward opposite ends of said cylinder, said first mentioned arm and said link of said crank member swinging past a dead center relationship to each other in moving said ground gripping wheel into inoperative position, and stop means for limiting the swinging of said arm and link past dead center position, for holding said ground gripping wheel in its inoperative position independently of said piston.

6. A non-skid and auxiliary traction device according to claim 5 in which said plate is provided with a part extending into the path of movement of said bell crank lever into its elevated position to cooperate with said link and said arm for limiting said movement of said bell crank lever into its elevated position.

7. A non-skid and auxiliary traction device for a motor vehicle having a driven wheel, said device including a ground gripping wheel, an arm pivotally mounted at one end on said vehicle eccentrically with relation to said driven wheel and having said ground gripping wheel rotatably mounted on the other end thereof and movable about its pivotal mounting to move said ground gripping wheel into and out of engagement with the surface on which said vehicle is supported, a pulley mounted in fixed relation to a driven wheel of the vehicle, a pulley secured to said ground gripping wheel, a belt connecting said pulleys, means controllable by the operator of the vehicle for swinging said arm to move said ground gripping wheel into and out of engagement with said surface, said arm being provided with a rigid lateral extension, an idler pulley mounted on said lateral extension in position to engage said belt to tighten the same when said arm is moved into operative position to place said ground gripping wheel on the ground, said idler pulley being moved out of engagement with said belt by the swinging of said arm into inoperative position.

8. A non-skid and auxiliary traction device for a motor vehicle having a driven wheel, said device including a bell crank lever pivotally mounted on said vehicle, a ground gripping wheel rotatably mounted on the outer end of one of the arms of said lever, said lever being swingable about its pivotal mounting to move said ground gripping wheel into and out of engagement with the ground on which the vehicle is supported, a driving connection between said ground gripping wheel and said driven wheel of said vehicle, a second arm pivotally mounted on said vehicle, a rigid link pivotally connecting said second arm to the other arm of said bell crank lever, means controlled by the operator for swinging said second arm for raising and lowering said ground gripping wheel through the medium of said link and bell crank lever, said other arm and said link moving slightly past dead center relation to each other when said ground gripping wheel is in an inoperative position, and stop means for limiting the movement of said other arm and said link beyond said positions in which they are slightly beyond dead center relation, for holding said ground gripping wheel in said inoperative position independently of said operator actuated means.

9. A non-skid and auxiliary traction device for a motor vehicle having a driven wheel, said device including a bell crank lever pivotally mounted on said vehicle, a ground gripping wheel rotatably mounted on the outer end of one of the arms of said lever, said lever being swingable about its pivotal mounting to move said ground gripping wheel into and out of engagement with the ground on which the vehicle is supported, a driving connection between said ground gripping wheel and said driven wheel of said vehicle, a crank pivotally mounted on said vehicle, and having two crank arms, a link connecting one arm of said crank with the other arm of said bell crank lever, means connected with the other arm of said crank for swinging the same to move said ground gripping wheel into and out of ground engaging positions, said link and the arm of said crank to which it is connected occupying substantially dead center positions when said ground gripping wheel is out of ground engaging position, the two arms of said crank being at the same side of a vertical plane passing through the pivotal axis of said crank when said dead center relation exists, so that the weight of both arms of said crank act to maintain said link and said first mentioned crank arm in dead center relation, and cooperating stop parts on said link and on the crank arm to which it is connected for limiting the extent to which said link may swing beyond said dead center position.

10. A non-skid and auxiliary traction device for a motor vehicle having a driven wheel, said device including a bell crank lever pivotally mounted on said vehicle, a ground gripping wheel rotatably mounted on the outer end of one of the arms of said lever, said lever being swingable about its pivotal mounting to move said ground gripping wheel into and out of engagement with the ground on which the vehicle is supported, a driving connection between said ground gripping wheel and said driven wheel of said vehicle, a crank arm pivotally mounted on said vehicle, a link connecting said crank arm to the other arm of said bell crank lever, power actuated means for swinging said crank arm about its pivot for imparting movement through said link to said bell crank lever for lowering and raising said ground wheel into and out of engagement with the ground, said crank arm and said link being arranged to swing slightly past dead center relation to each other when said ground gripping wheel is moved into its inoperative position out of engagement with the ground, and stop means cooperating with said crank arm and said link for limiting the extent to which said crank arm and link may swing past said dead center relation for supporting said ground gripping wheel in its inoperative position independently of said power actuated means.

11. A non-skid and auxiliary traction device according to claim 10 in which a second stop is provided which engages said bell crank lever when the same has been swung into a position in which said ground gripping wheel is raised out of engagement with the ground, and in which said crank arm and link are in dead center relations.

12. A non-skid and auxiliary traction device for a motor vehicle having a driven wheel, said device including a bell crank lever pivotally mounted on said vehicle, a ground gripping wheel rotatably mounted on the outer end of one of the arms of said lever, said lever being swingable about its pivotal mounting to move said ground gripping wheel into and out of engagement with the ground on which the vehicle is supported, a driving connection between said ground gripping wheel and said driven wheel of said vehicle, a crank arm pivotally mounted on said vehicle, a link connecting said crank arm to the other arm of said bell crank lever, power actuated means for swinging said crank arm about its pivot for imparting movement through said link to said bell crank lever for lowering and raising said ground wheel into and out of engagement with the ground, said crank arm and said link being arranged to swing slightly past dead center relation to each other when said ground gripping wheel is moved into its inoperative position out of engagement with the ground, and cooperating stop parts on said link and said other arm for limiting the movement of said other arm and link beyond said dead center relation to support said ground gripping wheel in elevated position independently of said power actuated means.

13. A non-skid and auxiliary traction device for a motor vehicle having a driven wheel, said device including a base member secured to the vehicle, a ground gripping wheel, an arm pivotally mounted at one end on said base member and having said ground gripping wheel rotatably mounted on the other end thereof, said arm being movable about its pivotal mounting to move said ground gripping wheel into and out of engagement with the surface on which said vehicle is supported, a pulley mounted in fixed relation to a driven wheel of the vehicle, a pulley secured to said ground gripping wheel, a belt connecting said pulleys, means controllable by the operator of the vehicle for swinging said arm to move said ground gripping wheel into and out of engagement with said surface, a stop on said base member with which said arm may move into engagement for limiting the movement of said ground gripping wheel into engagement with said surface, and stop means also mounted on said base member for limiting the movement of said ground gripping wheel into its inoperative position.

14. A non-skid and auxiliary traction device for a motor vehicle having a driven wheel, and a brake drum bolted to said wheel, said device including a ground gripping wheel, an arm pivotally mounted at one end on said vehicle and having said ground gripping wheel rotatably mounted on the other end thereof, said arm being movable about its pivotal mounting to move said ground gripping wheel into and out of engagement with the surface on which the vehicle is supported, a pulley secured to said ground gripping wheel, a pulley mounted on said driven wheel of said motor vehicle, a supporting spider for said pulley including a disk portion formed to be clamped between said brake drum and said driven wheel and having radially and laterally extending arms terminating at and secured to said last mentioned pulley in spaced relation to said brake drum, and a belt connecting said pulleys for driving said ground-gripping wheel.

GEORGE F. BREDL.
MICHAEL M. BREDL.
WENZL F. BREDL.

REFERENCES CITED

The following references are of record in the file of this patent:

UNITED STATES PATENTS

| Number | Name | Date |
|---|---|---|
| 938,557 | Todd | Oct. 19, 1909 |
| 1,153,791 | Johnson | Sept. 14, 1915 |
| 1,424,688 | Stehl | Aug. 1, 1922 |
| 1,636,997 | Helmling | July 26, 1927 |
| 2,002,518 | Baldwin | May 28, 1935 |
| 2,275,079 | Ingram | Mar. 3, 1942 |